July 9, 1963  GENSUKE NOJIMA  3,097,023
FLUIDTIGHT DEVICE FOR A BEARING
Filed Nov. 6, 1961

3,097,023
FLUIDTIGHT DEVICE FOR A BEARING
Gensuke Nojima, 1108 Kashima-cho, Higashiyodogawa-ku, Osaka City, Japan
Filed Nov. 6, 1961, Ser. No. 150,555
4 Claims. (Cl. 308—36.2)

This invention relates to a fluidtight device for a bearing and its object is to provide means of preventing fluid leaking out through the bearing part of a rotary pump.

With this object in view, the present invention provides a fluidtight device for a bearing in which a bearing box is concaved at its inner end, a bearing member lower in hardness than the bearing box and having a concaved head exactly fitting said concaved inner end of the bearing box is slidably mounted on a driving shaft, the rear end of the bearing member has a recess formed at its center with a spring furnished therein and supported by a ring slidably mounted on the shaft. The boss of an impeller has bored holes connecting at one end to a spout and at the other end to the back of the ring.

According to the present invention, a bearing box having a concave inner end slidably receives a bearing member of lower hardness with its inner end convexed, and at the rear end thereof a recess is cut, in which a spring is provided to press the bearing member against the bearing box, so that fluid is prevented from leaking out between the bearing box and the bearing member. Further, the spring is supported by a ring slidably mounted on the shaft, and part of impelled material such as pressure fluid which is being driven out of a rotary pump is led into a circular groove cut inside the bearing box and then through a number of holes bored in the boss fed to the back of the ring to press it from behind, so that when the convexed head of the bearing member is worn away and the necessary pressure by the spring is abated, it is reinforced by the fluid pressure and thus the bearing member remains pressed against the bearing box as hard as ever. Besides, in proportion to the increase of fluid pressure in the pump, pressure on the spring increases, so that the most desirable pressure acts on the bearing member and holds it against the bearing box, according to the strength of fluid pressure of the pump.

Other and the further objects of the present invention will become apparent from the following specification and claims taken together with the accompanying drawings in which is shown the preferred embodiment of the fluidtight device for a bearing according to the present invention.

Figure 1:
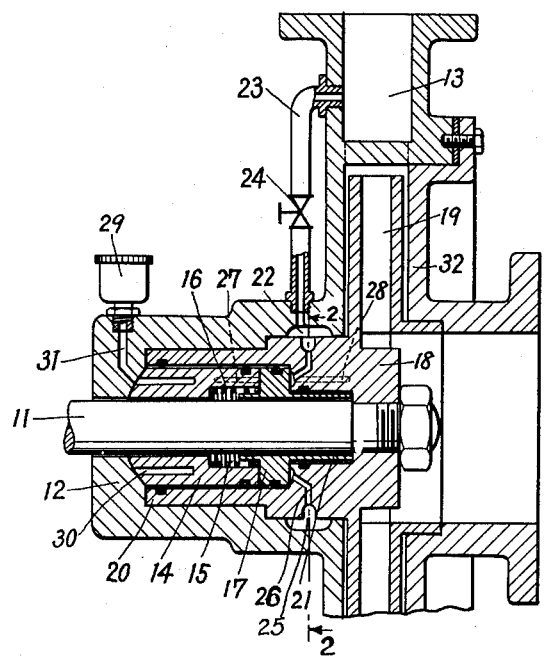
FIG. 1 is a sectional elevation of a fluidtight device for a bearing embodying the present invention in a rotary pump.
Figure 2:
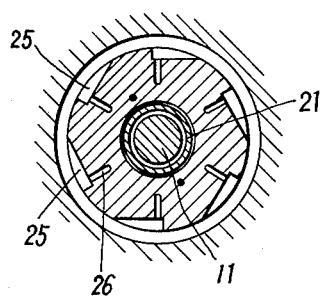
FIG. 2 is a sectional side view of a part of FIG. 2 on the line of 2—2.

In these drawings reference numeral 11 indicates a shaft, which passes through a bearing box 12 having a spout 13. On this shaft 11 is slidably mounted a bearing member 14, lower in hardness than the bearing box 12 and having a convexed head exactly fitting the concaved inner end of the bearing box 12. At the center of the rear end of the bearing member 14 is cut a recess 15, in which is set a spring 16, and a ring 17 is slidably mounted on the shaft 11. On the end of the shaft 11 is mounted and screwed a boss 18 of an impeller 19, and a cylindrical part 20 of the boss 18, extending axially therefrom, is inserted into a cylindrical gap between the bearing box 12, and the bearing member 14 and the ring 17. The gap between the cylindrical part 20, and the bearing member 14 and the ring 17 is kept fluidtight by packing rings. Thus the boss 18, pressing the spring 16 through the ring 17, holds the bearing member 14 against the bearing box 12. Into the gap between the shaft 11 and the boss 18 is inserted a cylindrical projection 21 formed on the ring 17, with the gap between the boss 18 and the cylindrical projection 21 kept fluidtight by a packing ring. On the inner surface of the bearing box 12 is cut a circular groove 22, which is connected to the pump spout 13 by a pipe 23 provided with a valve 24, and on the boss 18 opposite the circular groove 22 are cut a plurality of notches 25, at each of which is bored a hole 26 getting to the back of the ring 17 through the boss 18, so that fluid from the spout 13 can be fed to the back of the ring 17 through the pipe 23, the circular groove 22, the notches 25 and the holes 26. On each side of the ring 17 are fixed a plurality of pins 27, 28, which are inserted into holes in the bearing member 12 and the boss 18, so that the impeller 19, the bearing member 14 and the ring 17 may revolve with the shaft 11. The bearing box 12 is provided thereon with a grease pot 29, from which grease is fed into a grease hole 30 bored in the bearing member 14 through a grease way 31 in the bearing box 12. The bearing box 12 is screwed to a pump casing 32.

It is thought that the invention and its advantages will be understood from the foregoing description and it is apparent that various changes may be made in the forms, construction and arrangement of the parts without departing from the spirit and scope of the invention, the form hereinbefore described and illustrated in the drawing being merely a preferred embodiment thereof.

Having thus described my invention, what I claim and desire to secure by Letters Patent of the United States is:

1. A shaft seal construction comprising a bearing box having a bore therethrough adapted to receive a shaft, said bore having an enlarged portion with a concave end wall, a bearing member having a bore therethrough adapted to fit around the shaft in sliding relationship therewith, said bearing member having one end convex and mating with the concave end wall of the bearing box, said bearing member having a recess in the other end thereof, a spring in said recess, a ring having a bore therethrough adapted to fit around the shaft in sliding relationship therewith, said spring bearing against said ring, a rotor member adapted to be secured to said shaft and rotatable within the enlarged portion of the bearing box bore, said rotor member having a recess therein into which said bearing member and said ring fit, said ring abutting against the end of said recess, sealing rings between said rotor member and the peripheral surfaces of said bearing member and said ring, means securing said ring and said bearing member to said rotor and allowing relative sliding of said bearing member, ring and rotor, and means for supplying fluid under pressure through said rotor and against the face of said ring on the opposite end of the ring from the end against which said spring bears, whereby the spring pressure and the fluid pressure combine to force said bearing member against the end wall of said bearing box.

2. A shaft seal as claimed in claim 1 in which the material of said bearing box is harder than the material of said bearing member.

3. A shaft seal as claimed in claim 1 in which said means securing said ring and said bearing member to said rotor comprise pins on both ends of said ring, said bearing member and said rotor having holes into which said pins are slidable.

4. A shaft seal as claimed in claim 1 in which said means for supplying fluid comprise a fluid conduit extending into the enlarged portion of the bore of said bearing box, said bearing box having a groove around the interior thereof into which said conduit opens, and said rotor has a plurality of passageways therethrough extending from a point on the periphery of said rotor opposite said groove in the bearing box to the end of the recess in said rotor member.

References Cited in the file of this patent

UNITED STATES PATENTS

| 654,881 | Durand | July 31, 1900 |
| 1,458,183 | Heideman | June 12, 1923 |

FOREIGN PATENTS

| 752,465 | France | July 17, 1933 |